United States Patent [19]

Jamzadeh

[11] Patent Number: 5,568,269
[45] Date of Patent: Oct. 22, 1996

[54] METHOD AND APPARATUS FOR SCANNING AND PRINTING DOCUMENTS WITH TEXT AND IMAGES

[75] Inventor: Feraydoon S. Jamzadeh, Fairport, N.Y.

[73] Assignee: Eastman Kodak Company, Rochester, N.Y.

[21] Appl. No.: 116,159

[22] Filed: Sep. 2, 1993

[51] Int. Cl.$^6$ ................. H04N 1/40; H04N 1/46
[52] U.S. Cl. ................. 358/298; 358/462; 358/532
[58] Field of Search ................. 358/298, 296, 358/300, 406, 444, 456, 459, 462, 504, 505, 515, 518, 521, 523, 524, 525, 529, 530–532, 534, 538, 540; 382/162, 167, 264, 266, 269, 299, 300, 302, 318, 319; 395/114–116, 128; 347/129, 131, 224, 225, 232, 251, 254

[56] References Cited

U.S. PATENT DOCUMENTS

| | | | |
|---|---|---|---|
| 4,135,212 | 1/1979 | Pugsley et al. | 358/256 |
| 4,926,200 | 5/1990 | Ohyama et al. | 346/160 |
| 4,994,827 | 2/1991 | Jamzadeh et al. | 346/157 |
| 5,040,026 | 8/1991 | Jamzadeh et al. | 355/271 |
| 5,045,869 | 9/1991 | Isaka et al. | 346/108 |
| 5,047,791 | 9/1991 | Jamzadeh et al. | 346/157 |
| 5,125,042 | 6/1992 | Kerr et al. | 382/47 |
| 5,125,072 | 6/1992 | Ng | 395/116 X |
| 5,129,048 | 7/1992 | Ng | 395/110 |
| 5,151,717 | 9/1992 | Jamzadeh et al. | 346/157 |
| 5,157,417 | 10/1992 | Anzai | 358/298 X |
| 5,175,628 | 12/1992 | Jamzadeh et al. | 358/300 |
| 5,239,625 | 8/1993 | Bogart et al. | 395/128 |
| 5,276,532 | 1/1994 | Harrington | 358/444 |
| 5,278,670 | 1/1994 | Eschbach | 358/462 X |
| 5,283,671 | 2/1994 | Stewart et al. | 358/532 |
| 5,293,254 | 3/1994 | Eschbach | 358/456 X |
| 5,383,036 | 1/1995 | Mailloux et al. | 358/518 |

*Primary Examiner*—Peter S. Wong
*Assistant Examiner*—Eric Frahm
*Attorney, Agent, or Firm*—Nelson A. Blish

[57] ABSTRACT

A method and apparatus for reproducing both pictorial image information and text information on a sheet or surface used in the production of a printed page. The original image is scanned at a low resolution to produce density values for each color separation. The original image is then scanned at a second higher resolution to derive signals representative of the density values for the black separation. Scanned data for each color separation is stored and then interpolated to the second higher resolution prior to being printed and the data associated with the black separation is then printed at its original resolution by the printer.

12 Claims, 2 Drawing Sheets

METHOD AND APPARATUS FOR SCANNING AND PRINTING DOCUMENTS WITH TEXT AND IMAGES

CROSS-REFERENCE TO RELATED APPLICATION

Reference is made to U.S. patent application Ser. No. 08/078,539, filed on Jun. 17, 1993, in the name of Feraydoon S. Jamzadeh. This application is assigned to the assignee of the present invention.

FIELD OF THE INVENTION

The invention relates to a method and apparatus for reproducing both images and text on a sheet or surface having different resolutions to create a printed page.

BACKGROUND OF THE INVENTION

Difficulty has always been encountered when trying to produce prints having the highest quality when they contain both images as well as text and line art. It is well known in the imaging field that to generate the highest quality prints, images (pictorial) need to contain a resolution of 200–300 dpi with 24 bits per color pixel and for text and line art, even higher resolution data is needed, e.g., 500–2000 dpi with 1 bit per pixel.

It is well known that images require a lower resolution, but require many bits per pixel. On the other hand, line art requires high resolution but relatively few bits per pixel. To reduce the cost of a system that handles both high resolution and a large number of bits per pixel, there have been several suggested solutions.

U.S. Pat. No. 5,125,072, issued to Ng in June, 1992, suggests the use of a dual-channel data path. One channel carries the text and line art data at the required high resolution while the second channel carries the image (video) data at the lower resolution, but with a large number of bits per pixel. Each of the two channels have their own storage areas and buffers. The image data is interpolated up (expanded) to equal the resolution of the line art before printing. Then the line art and image data are combined to create the raster lines of the print in a high speed band buffer. The combining process is performed at the highest data rate of the printer and are based on the instructions of a location look-up table.

There are two drawbacks associated with the above teachings. First, such a method and apparatus needs two separate storage areas (frame-stores), with each frame-store requiring its own input and output pipeline along with its own control circuitry. This additional electronics adds considerably to the cost of the entire procedure. It should also be noted that each frame-store must be of substantial size, because any page to be printed may consist of entirely text and line art or images requiring the most memory. The second problem is that the data path comprises many of the functional blocks that must operate at the high clock rate (increased speed) of the print head. Such functional blocks are: the band buffer and the combiner, the location look-up table and its control system, and the print head controller (laser interface). These high speed electronic elements cost more because they are more difficult to develop, manufacture and de-bug.

U.S. Pat. No. 4,135,212 issued to Pugsley et al in January, 1979, is very similar to U.S. Pat. No. 5,125,072, discussed above. The difference is that the '212 patent restricts the resolution of the text and line art area to an integer multiple of the image resolution. Accordingly, the problems discussed above would once again be encountered with the Pugsley et al teachings.

U.S. Pat. No. 5,157,417, issued to Anzai in October, 1992, suggests the use of a printer capable of changing its resolution. The invention describes how the printer resolution could be changed in the vertical direction. There are many problems with such a solution. Firstly, Anzai only teaches how to change the printer resolution in the vertical direction. If the text and images are positioned side by side, this method will not work. Secondly, Anzai teaches the use of a polygon based raster printer that is capable of varying its rotational speed according to the resolution desired. The cost of such a motor controller will be prohibitive when one considers that motor controllers used in present laser printers that rotate at only a single speed are very costly. The reason for such high cost is the requirement for extremely precise speed control that will maintain the velocity variations (flutter) of the polygon at or below 0.1%, motor controllers that provide such low flutter at multiple speeds will certainly cost many times more than present single speed systems. Thirdly, this apparatus is similar to the previous Ng disclosure discussed above and also requires multiple frame-stores for each resolution. As indicated earlier, the extra cost for the duplicate electronic pipelines and extra control circuits reduces the viability of this solution. A fourth problem is encountered when one attempts to vary the clock speed of the laser writer as resolution is being varied. The clock speed of typical laser writers are above 20 MHz and laser driver systems that operate at several different speeds in that range and maintain their precision within the scan line along the printed page will also be too expensive for mass produced printers. A fifth and final problem associated with the Anzai apparatus is the requirement of stopping the printing process whenever the resolution of the printer is changed. The reason for such a delay is to allow the spinning polygon to adjust its speed to accommodate the new resolution. This type of solution cannot be applied to electrophotographic and electrographic printers; because of the different rates of dark decay as one moves along the printed page, any cessation in printing would result in different tone and color reproductions within that page. Furthermore, there is no teaching of how to vary the spot size of the exposing laser beam as the resolution is changed. This has been shown to be possible in some other applications. Once again, the cost would have to increase for a variable spot size laser scanner further impacting the viability of such approach.

U.S. Pat. No. 4,926,200, issued to Ohyama et al in May, 1990 discloses an electrophotographic printer with two exposure heads. One head is designed for exposing images at one resolution and the other head exposes text at another resolution. This invention addresses many of the problems at hand, but would result in prohibitive cost. Exposure subsystems (print heads) are usually one of the most expensive subsystems in the electrophotographic printers. To include two of them in one printer will substantially increase the cost of that printer. Furthermore, one must provide two complete and independent data paths for each print head, clearly increasing the cost of such printer even more.

U.S. Pat. No. 5,045,869, issued to Isaka et al in September, 1991 discloses a printer that can operate at several different resolutions, similar to Anzai's disclosure described above. The difference between Isaka's patent and Anzai's patent is that Anzai claims to change the resolution of the printer on the fly as printing is in progress. Isaka, on the other hand, changes the printer resolution before the printing begins. The selected resolution is to match the needs of the document to be printed. Most of the problems associated with Anzai will find application here as well, such as the use of a dual speed polygon motor and varying the clock speed to change resolution.

Once again, there is no explanation of how to change the spot size of the laser beam as the resolution is changed. One cannot expose with a 300 dpi spot size and expect the equivalent results that a 600 dpi printer would deliver. Similarly, with a spot size properly designed for 600 dpi exposure subsystems, one would not be able to produce solid density patches when it is applied to 300 dpi printing system. The reason is that the spot size for the 600 dpi printer is too small to overlap in two adjacent lines/rows. Therefore, solid areas could not be totally exposed.

SUMMARY OF THE INVENTION

In a majority of high quality printing situations, the text and line art are printed in a different color than the images. Usually black is used for the text while the three primary subtractive colors of cyan, magenta and yellow are used for images. The data path of the present invention is for a fixed resolution 500 dpi printer to receive an input at about 250 dpi. The lower resolution input allows for maintaining full throughput of the system by reducing the period needed for transmitting the print data to the printer. It also reduces the cost of the printer by reducing the size of the frame-store needed. When extremely high quality text is needed, the printing system will accommodate it by handling the black separation at full resolution of 500 dpi from beginning to end. The Image Data Manager(IDM) creates the black text at 500 dpi and sends it to the printer. The printer will print the 3-color image(s) as they are scanned by the scanner at 250 dpi in normal operating mode and without any skip cycles. The transmission of the black separation to printer may take 10 to 30 seconds. Meanwhile, the print engine will skip cycles. When the printer frame-store is full with the 500 dpi black separation, the exposure begins. The interpolator is bypassed in this mode and data is directly read from the frame-store into the edge enhancer subsystem. The printer resolution is always fixed at 500 dpi. The laser interface section is also designed for 500 dpi printing and its clock rate will remain constant.

It is an object of the present invention to solve the problems encountered in the prior art. In the present invention, high resolution data is used for text and lower resolution data is associated with images that are to be printed. This is achieved using a fixed resolution printer without the enormous expense associated with multi-resolution printers. Also, a simple, single, and straight forward data path is used and only one frame-store is needed in the data path thereby simplifying the system and reducing cost.

The present invention provides a method of reproducing both pictorial image information and text information on a sheet or surface used in the production of a printed page, comprising the steps of scanning the original image at a first resolution to derive electrical signals representative of the density values of successively scanned elements for each color separation. Scanning the original image at a second and higher resolution to derive electrical signals representative of the density values of successively scanned elements for the black separation. The scanned data for each separation is stored and then the stored scanned original image data is interpolated to the second resolution for each color separation. Printing the interpolated original image data for each color separation at the second resolution and printing the original image data for the black separation at the second resolution.

The present invention further provides an apparatus for producing a page output from electronic input data. The apparatus comprising means for storing up to one or more complete pages of color separations of input data at a first pixel per inch resolution and means for expanding the color separation input data stored at the first resolution to a second higher pixel per inch resolution. Also included are means for storing up to one complete page of a black separation input data at a second higher pixel per inch resolution and means for printing said expanded color separation input data at the second pixel per inch resolution and printing the black separation input data at the second higher pixel per inch resolution.

BRIEF DESCRIPTION OF THE DRAWINGS

Further advantages and uses of this invention will become apparent when considered in view of the following detailed description and drawings, in which.

DETAILED DESCRIPTION OF THE PREFERRED EMBODIMENT

Preferred embodiments of this invention will be described with reference to the accompanying drawings.

Figure 1:
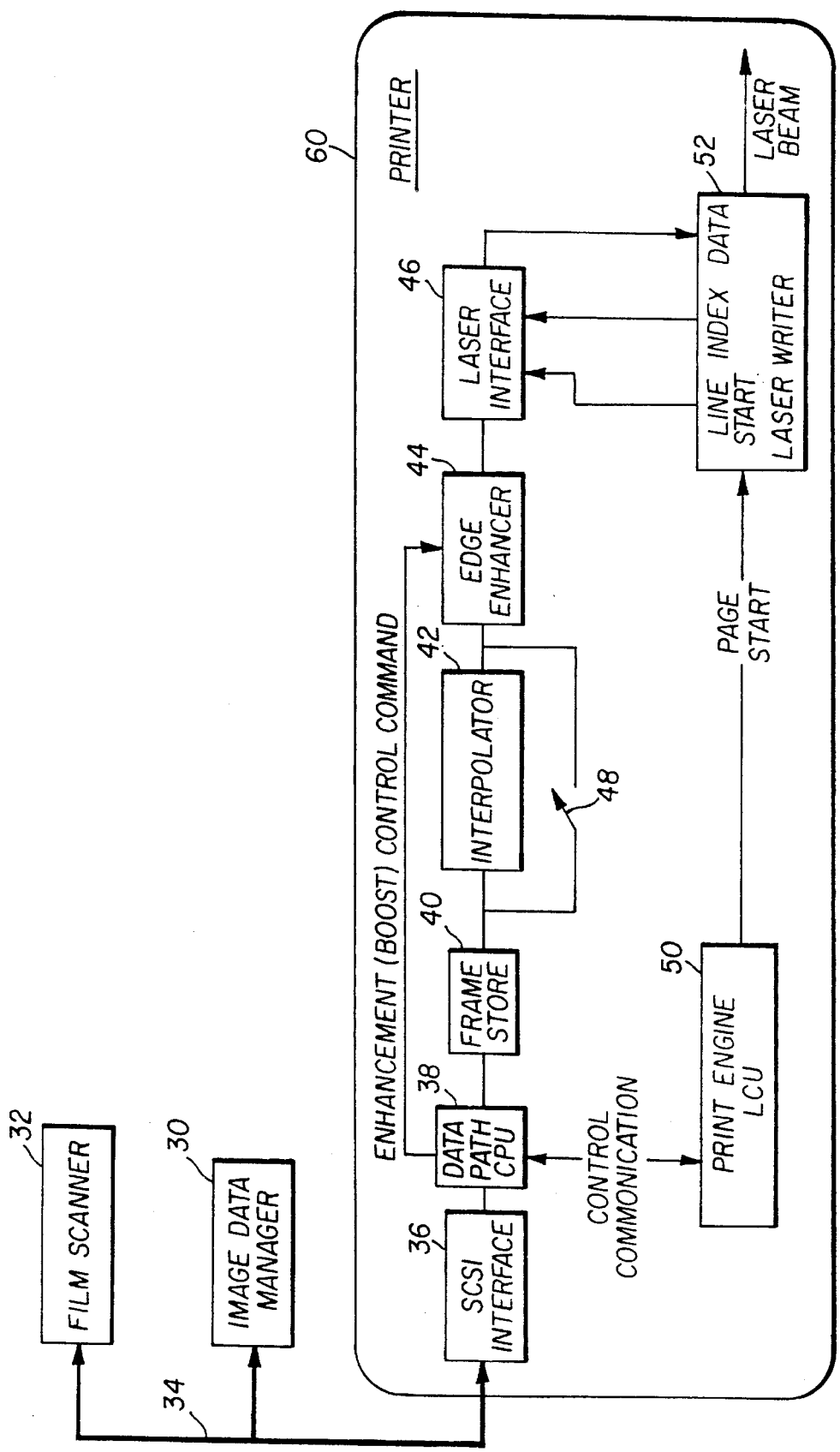
FIG. 1 is a schematic block diagram showing the arrangement of a data printing system according to the present invention.

Referring now to the drawings, and FIG. 1 in particular, there is shown a block diagram of the preferred embodiment of the present invention. The Image Data Manager 30 (IDM) takes the form of a computer that performs two functions. It controls the overall operation of the system by monitoring the performance of the system and commanding the functions of the scanner 32 and printer 60. The IDM also creates and modifies or composes some of the images to be printed. It is capable of generating high resolution text in raster form from instructions received as a page description language like POSTSCRIPT® (registered trademark of Adobe Systems, Inc.). The IDM 30 can also modify images at a resolution that is usually lower than the printer's 60 printing resolution. It should be understood that the IDM 30 could take the form of a low-cost general purpose personal computer or a higher performance work station depending on the degree of performance required based on the quality of the images to be produced.

The scanner 32 may also take many forms from an inexpensive, very low-end, low resolution flat-bed scanner used primarily for desk-top publishing. These are usually charge coupled devices (CCD) type scanners that are used to scan photographs (reflection documents) at what is considered a low resolution. The next level of scanners are capable of operating at several resolutions. This type of scanner can scan images as well as text and graphics from a fixed format film, typically 35 mm film. These are also CCD type scanners and read images off of the film at a lower resolution (typically 20014 300 dpi) than when scanning text and graphics (400–600 dpi). An example of medium cost scanners is the Eastman Kodak Photo CD 2000 film scanner. Use of a high-end scanner is employed in the graphic arts industry where very high quality prints are desired. This type of scanners are either laser beam or photo-multiplier-tube based scanners that are capable of scanning reflection as well as transmission documents at many different resolutions; the resolution could vary from a few hundred dpi to several thousand dpi.

An important aspect of the present invention, regardless of the type of scanner employed, is in scanning the black separation, which contains text and graphics, at a higher resolution than the color separation which usually contains images. The black separation is usually scanned at the same resolution as that of the printer.

The communication channel 34 is the connecting link between the IDM 30 film scanner 32 and printer 60. If desired, communication channel 34 can take the form of a computer network link or any of the commonly used computer communication modes such as SCSI (small computer system interface) or GPIB (general purpose interface bus). The communication interface module 36 inside printer 60 will match the type of communication selected; in this case, SCSI.

The data path CPU 38 separates the print data from the printing instructions and commands. The instructions that deal with the physical operation of the printer are separated and sent to the print engine logic and control unit 50. The print data representing images, graphs and text is sent for temporary storage to frame-store 40. The printing instructions that relate to the data path are executed by data path CPU 38. These instructions include the setting of the switch 48 for the interpolator 42 and the amount of boost or gain required for the edge enhancer 44. The CPU 38 is a general purpose micro-processor.

Frame-store 40 is the location for storing print data before printing. When using electrophotographic printers once the exposure process for one separation begins, the printer cannot be stopped until the entire separation is exposed. This requirement dictates that the frame-store 40 must be large enough to store at least one full separation. In practicing the present invention, the black separation contains the largest amount of data because it is generated or scanned at a higher resolution than the color separations. For example, the black separation for a 12"×18" page at 500 dpi would require 54 Mbytes of storage space. In contrast, the color separations for the same page at 250 dpi would only require 13 Mbytes each. Clearly, all the color separations could be saved in frame-store 40 simultaneously. U.S. Pat. No. 5,175,628, issued on Dec. 29, 1992 in the name of Jamzadeh et al, teaches how a frame-store may be used to store and retrieve multiple image separations simultaneously, which allows one to scan images in one sequence and print them in a different sequence. Because the black separation contains so much more data than the color separation in this application, the frame-store operates differently when it is working with the black separations. It should be noted that the entire storage space in the frame-store is used for black data only with no color data being stored in the frame-store when the black separation is being printed. A second fact to be noted in this application is that frame-store 40 only stores or retrieves the black separation in any instance, i.e., there is no simultaneous reading and writing within the frame-store. This is because of the large amount of data associated with the black separation and the limited bandwidth of the data path elements that precede the interpolator 42. Typically, communications channel 34, SCSI interface 36, data path CPU 38 and the input to frame-store 40 can only handle 1–2 Mbytes of data per second without increasing their cost substantially.

Therefore, to send 54 Mbytes of black separation data from image data manager 30 or scanner 32 to the printer 60, one must allow between 27–54 seconds. This time period is much longer than is needed for printer 60 to expose one separation; typically, it was found that the printer could expose each separation within 6 seconds. Accordingly, printer 60 must idle while the black separation data is being loaded into frame-store 40. Once frame-store 40 is full with 54 Mbytes of black separation data, the printing of the black separation begins. The output of frame-store 40 has a clock rate that sends the data at rates above 9 Mbytes per second; that is 54 Mbytes in 6 seconds. Interpolator 42 is bypassed by switch 48, and the full resolution data is sent directly to edge enhancer 44.

U.S. Pat. No. 5,125,042, issued to Kerr et al on Jun. 23, 1992, describes in detail the operation of an interpolator that could be used in the present invention for interpolator 42. U.S. patent application Ser. No. 08/078,539 filed on Jun. 17, 1993, explains the details of construction and operation of the edge enhancer 44 in the present invention.

The laser interface 46 buffers the print data and synchronizes the data path signal with the mechanical requirements of the laser writer 52. This includes proper clocking of each raster line as the facets of the polygon/hologon spinner direct and control the laser diode beam.

The print engine LCU (logic and control unit) 50 controls the mechanical operation of printer 60, such as the actuations of paper handling subsystem as well as development stations and fusing mechanism. It also controls the positioning of the final print on the paper by issuing the page-start signal to laser writer 52 at the proper time.

Figure 2:
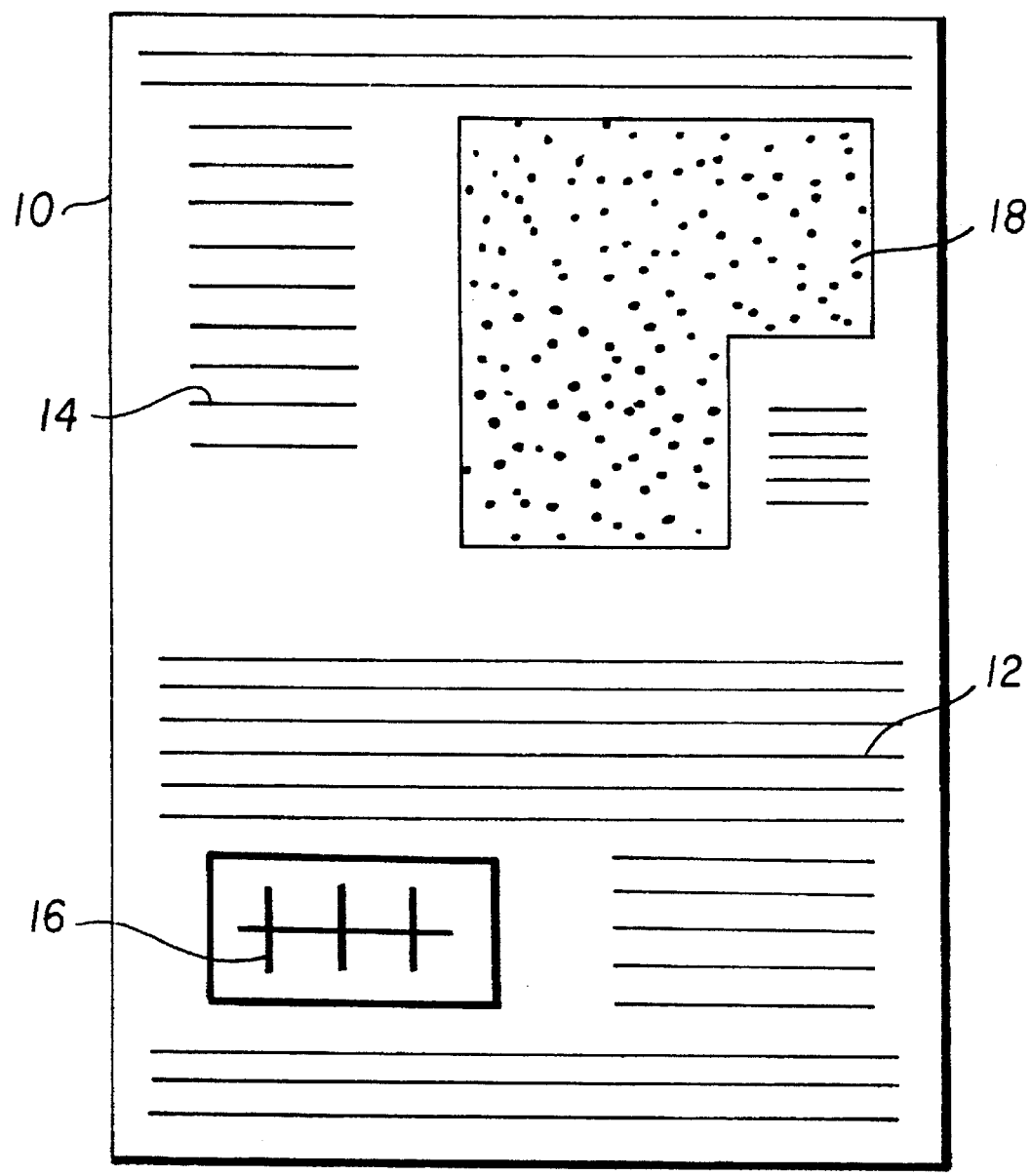
FIG. 2 illustrates a printed page with various types of images thereon.

Turning our attention to FIG. 2 which shows an example of a typical document composed and printed by this apparatus. The printed page 10 contains an example of the three possible types of print data that may be encountered. The area 18 contains color images that are originally scanned or generated at a resolution lower than the resolution of the printer. During printing, interpolator 42 increases the resolution of the printer. It should be noted that area 18 is the only part of page 10 that contains color information in the form of the three-color separations of cyan, magenta and yellow. Accordingly, after the color separations are exposed, developed and transferred to the paper, only area 18 of the final page is produced in color.

Regions 12 and 14 on page 10 both contain text, but at different fonts and character sizes. These regions are to be printed with the use of black toner. At the time the regions were either generated or scanned, it was at a resolution higher than the resolution of region 18. This higher resolution would be the equivalent of the printer's resolution. When these regions are printed, interpolator 42 is not needed and it is bypassed by closing switch 48.

Region 16 contains charts and/or graphs that will also be printed using black toner. This region, just like the text regions 12 and 14 is either generated or scanned at a high resolution and is printed with interpolator 42 bypassed by switch 48.

The black separation is made up of regions 12, 14 and 16. This black separation is exposed, developed and transferred to paper separate from the color separations and may be transferred either before or after the color separations. After all four separations (cyan, magenta, yellow and black) are transferred to paper, the sheet is fused and the printed page 10 is finished.

As many apparently widely different embodiments of the present invention can be made without departing from the spirit and scope thereof, it is to be understood that the invention is not limited to the specific embodiments thereof, except as defined in the appended claims.

This invention can be applied to any color printer that develops the color separations in separate passes (cycles). This includes electrophotographic and electrographic printers such as those described in U.S. Pat. Nos. 4,994,827, 5,040,026, 5,047,791 and 5,151,717. In addition, the present invention can find application in printers that use silver halide paper or film, as well as some ink jet and thermal printers.

This invention applies only to the cases that require non-full color text. If full color text is needed (seldom is requested), this invention will still work but would not render as many benefits. The amount of time that the printer has to idle until each full resolution separation is delivered to it, would be more than the actual printing time. This would make it a very inefficient printing system.

I claim:

1. A method of reproducing both pictorial image matter and text on a sheet or surface, comprising the steps of:

scanning an original image at a first resolution to derive electrical signals representative of density values of successively scanned elements for a color separation for each primary color associated with said image;

scanning the original image at a second and higher resolution to derive electrical signals representative of density values of successively scanned elements for a black separation;

storing data obtained from scanning each separation;

interpolating the stored scanned original image data to said second resolution for each color separation;

printing said interpolated original image data for each color separation at said second resolution; and printing said original image data for said black separation at said second resolution.

2. An apparatus for producing a page output from electronic input data, said apparatus comprising:

means for storing color separation input data at a first pixel per inch resolution;

means for expanding said color separation input data stored at said first pixel per inch resolution to a second higher pixel per inch resolution;

means for storing a black separation input data at a second higher pixel per inch resolution; and means for printing said expanded color separation input data and said black separation input data at said second higher pixel per inch resolution.

3. The apparatus as set forth in claim 2 wherein the stored data for the black separation is at the first resolution and the stored data for the color separation input data is at the second resolution, and the second resolution level is greater than said first resolution level.

4. The apparatus as set forth in claim 3 wherein a total pixel storage capacity of the means for storing the black separation input data is several times a total pixel storage capacity of the means for storing the color separation input data.

5. The apparatus as set forth in claim 3 wherein a bit depth of the stored data for the black separation input data is 1 bit per pixel and a bit depth of the stored data for the color separation input data is 24 bits per pixel.

6. An apparatus for reproducing both pictorial image matter and text on a sheet or surface, said apparatus comprising:

a photoelectric scanner for scanning an original image at a first resolution to generate electrical signals representative of density values of successively scanned elements for a color separation for each primary color associated with said image;

said photoelectric scanner also for scanning the original image at a second and higher resolution to generate electrical signals representative of density values of successively scanned elements for a black separation;

a frame-store for storing data representing the electrical signals for each color separation and the black separation;

an interpolator for increasing to the second resolution the stored data associated with each color separation; and a printer for printing the interpolated data from said interpolator for each color separation and the stored data for the black separation at said second resolution.

7. A method of producing a page output from electronic input data comprising the steps of:

storing color separation input data at a first pixel per inch resolution;

expanding said color separation input data stored at said first pixel per inch resolution to a second higher pixel per inch resolution;

storing black separation input data at a second higher pixel per inch resolution; and printing said expanded color separation input data and said black separation input data at said second higher pixel per inch resolution.

8. An apparatus for producing a page output from electronic input data, said apparatus comprising:

a frame-store for storing multiple complete pages of a color separation input data for each primary color of an image at a first pixel per inch resolution;

an interpolator for expanding said color separation input data stored at said first pixel per inch resolution to a second higher pixel per inch resolution;

wherein said frame-store stores one page of a black separation input data at the second higher pixel per inch resolution;

a print engine for printing said expanded color separation input data and said black separation input data at said second higher pixel per inch resolution.

9. An apparatus for reproducing both pictorial image matter and text, said apparatus comprising:

a contact array scanner for scanning an original image at a first resolution to derive first electrical signals representative of a first density value for a color separation for each primary color associated with said image;

an electronic generator for generating an image at a second and higher resolution comprised of second electrical signals representative of density values of elements forming data for a black separation;

a frame-store for storing the first electrical signals for each color separation, said frame-store having storage capacity for one complete page of a black separation input data at the second resolution;

an interpolator for expanding the stored first electrical signals to said second resolution for each color separation;

a print engine for printing said interpolated first electrical signals for each color separation and said second electrical signals for said black separation at said second resolution.

10. An apparatus as set forth in claim 9 wherein said electronic generator is a computer.

11. An apparatus as set forth in claim 9 wherein said apparatus further includes means for enhancing edges of said interpolated original image data for each color separation and said original image data for said black separation, both of which are at said second resolution, prior to printing said original image data.

12. An apparatus for reproducing both pictorial image matter and text on a sheet or surface, said apparatus comprising:

a contact array scanner for scanning an original image at a first resolution to derive first electrical signals representative of successively scanned elements for a color separation for each primary color associated with said image;

electronically generating second electrical signals at a second higher resolution representative of a density value for successively scanned elements of text for a black separation;

a frame-store for storing the first electrical signals for each color separation, wherein said frame-store can store second electrical signals representing one complete page of a black separation input data at the second resolution;

an interpolator for expanding the stored first electrical signals to said second resolution for each color separation;

a print engine for printing said interpolated first electrical signals for each color separation and the stored second electrical signals for said black separation at said second resolution.

* * * * *